United States Patent
Mao

(10) Patent No.: US 10,245,618 B2
(45) Date of Patent: Apr. 2, 2019

(54) LINEAR VIBRATION MOTOR

(71) Applicant: Lubin Mao, Shenzhen (CN)

(72) Inventor: Lubin Mao, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 206 days.

(21) Appl. No.: 15/417,150

(22) Filed: Jan. 26, 2017

(65) Prior Publication Data

US 2017/0341108 A1 Nov. 30, 2017

(30) Foreign Application Priority Data

May 27, 2016 (CN) .................... 2016 2 0505732 U

(51) Int. Cl.
*H02K 33/00* (2006.01)
*B06B 1/04* (2006.01)
*H02K 1/34* (2006.01)
*H02K 33/16* (2006.01)

(52) U.S. Cl.
CPC ............... *B06B 1/045* (2013.01); *H02K 1/34* (2013.01); *H02K 33/00* (2013.01); *H02K 33/16* (2013.01)

(58) Field of Classification Search
CPC .......... H02K 1/34; H02K 33/00; H02K 33/16; B06B 1/045
USPC .......................................................... 310/25
See application file for complete search history.

(56) References Cited

U.S. PATENT DOCUMENTS

| 10,097,072 | B2 * | 10/2018 | Xu | .................. | H02K 33/12 |
| 2016/0013710 | A1 * | 1/2016 | Dong | ................. | H02K 33/16 |
| | | | | | 310/25 |
| 2016/0181900 | A1 * | 6/2016 | Xu | .................. | H02K 33/16 |
| | | | | | 310/12.27 |
| 2017/0033672 | A1 * | 2/2017 | Xu | .................. | H02K 33/16 |
| 2017/0110951 | A1 * | 4/2017 | Akanuma | .......... | H02K 33/16 |

* cited by examiner

*Primary Examiner* — Thanh Lam
(74) *Attorney, Agent, or Firm* — Na Xu; IPro, PLLC

(57) ABSTRACT

A linear vibration motor is disclosed, which comprises a housing having a receiving space; a vibrator unit received in the receiving space; an elastic members having one end connecting to the vibrator unit and another end connecting to the housing for suspending the vibrator unit in the receiving space; a first damping member arranged between the housing and one side of the elastic member; and a second damping member arranged between the vibrator unit and the other side of the elastic member.

8 Claims, 5 Drawing Sheets

LINEAR VIBRATION MOTOR

FIELD OF THE APPLICATION

The present application relates to vibration motor for generating tactile vibrations, more particularly to a linear vibration motor used in a portable consumer electronic device.

DESCRIPTION OF RELATED ART

A linear vibration motor is a device which converts electric energy into mechanical vibration. In general, the linear vibration motor is mounted in a portable consumer electronic device, in order to generate tactile feedback, such as vibration of a mobile phone or tactile feedback of a play station portable.

In the related art, the linear vibration motor generally comprises a damping block arranged between an elastic member and a weight in order to control the vibration of the weight and further reduce the noise caused by the exceeding amplitude of the weight. However, such a damping block produces smaller mechanical damping for the weight; therefore, the linear vibration motor has an unstable vibration and a slow response.

Accordingly, it is desirable to provide an improved linear vibration motor for solving the problems mentioned above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present application will hereinafter be described in detail with reference to an exemplary embodiment.

Figure 1:
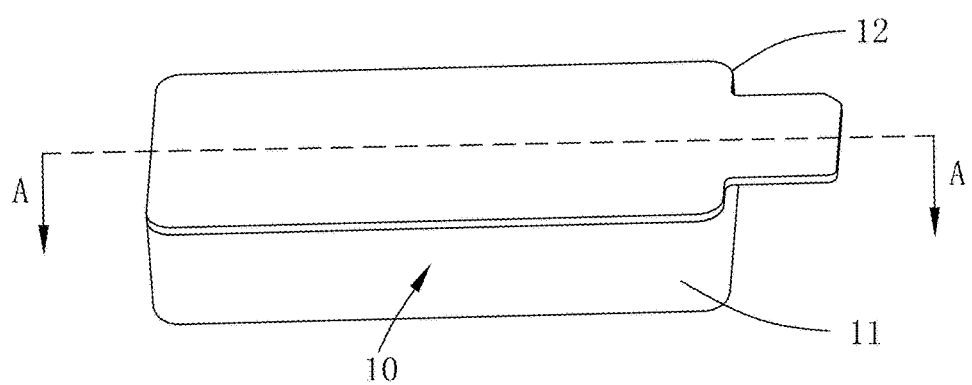
FIG. 1 is an isometric view of a linear vibration motor according to the present disclosure.
Figure 2:
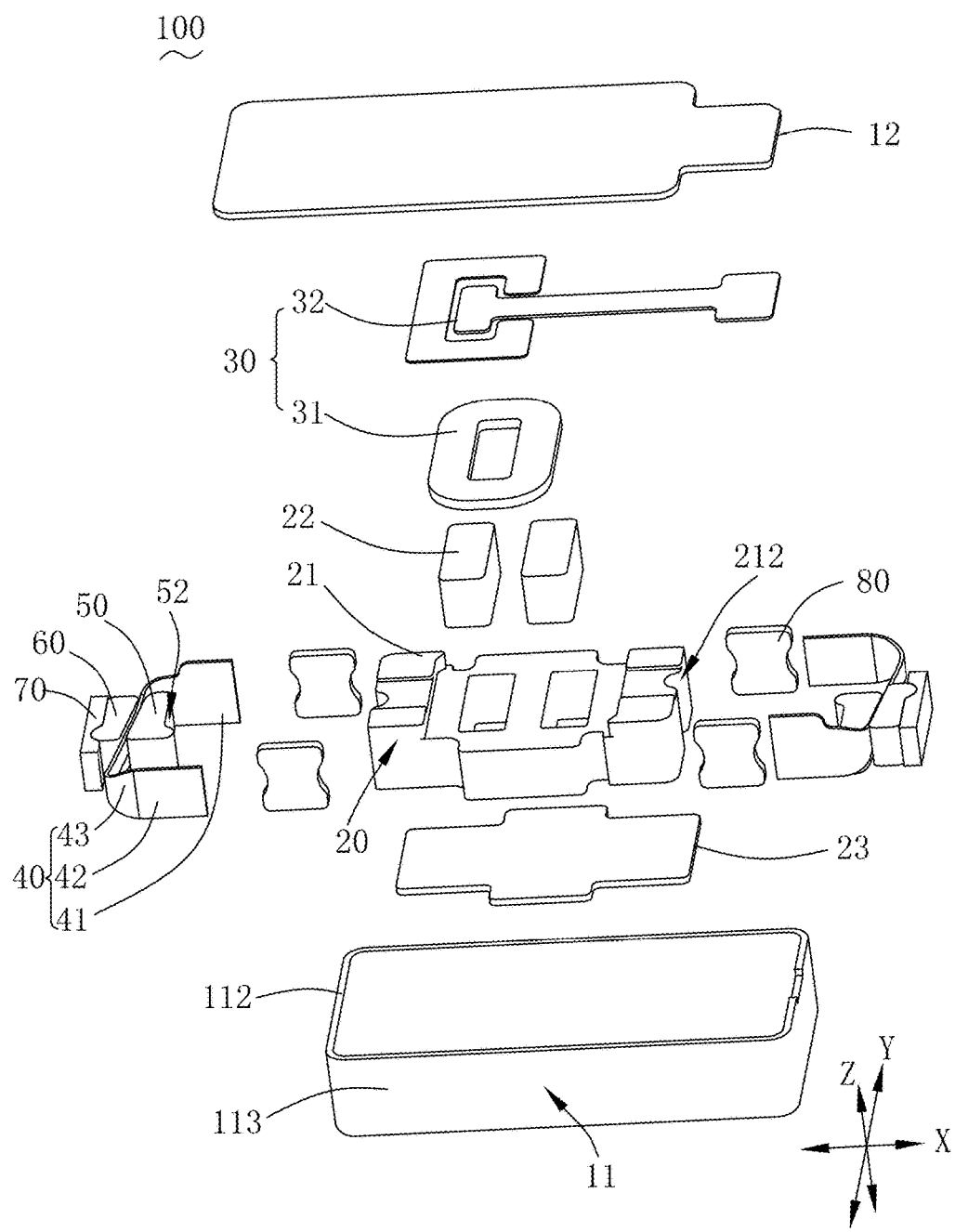
FIG. 2 is an explored view of the linear vibration motor shown in FIG. 1.
Figure 3:
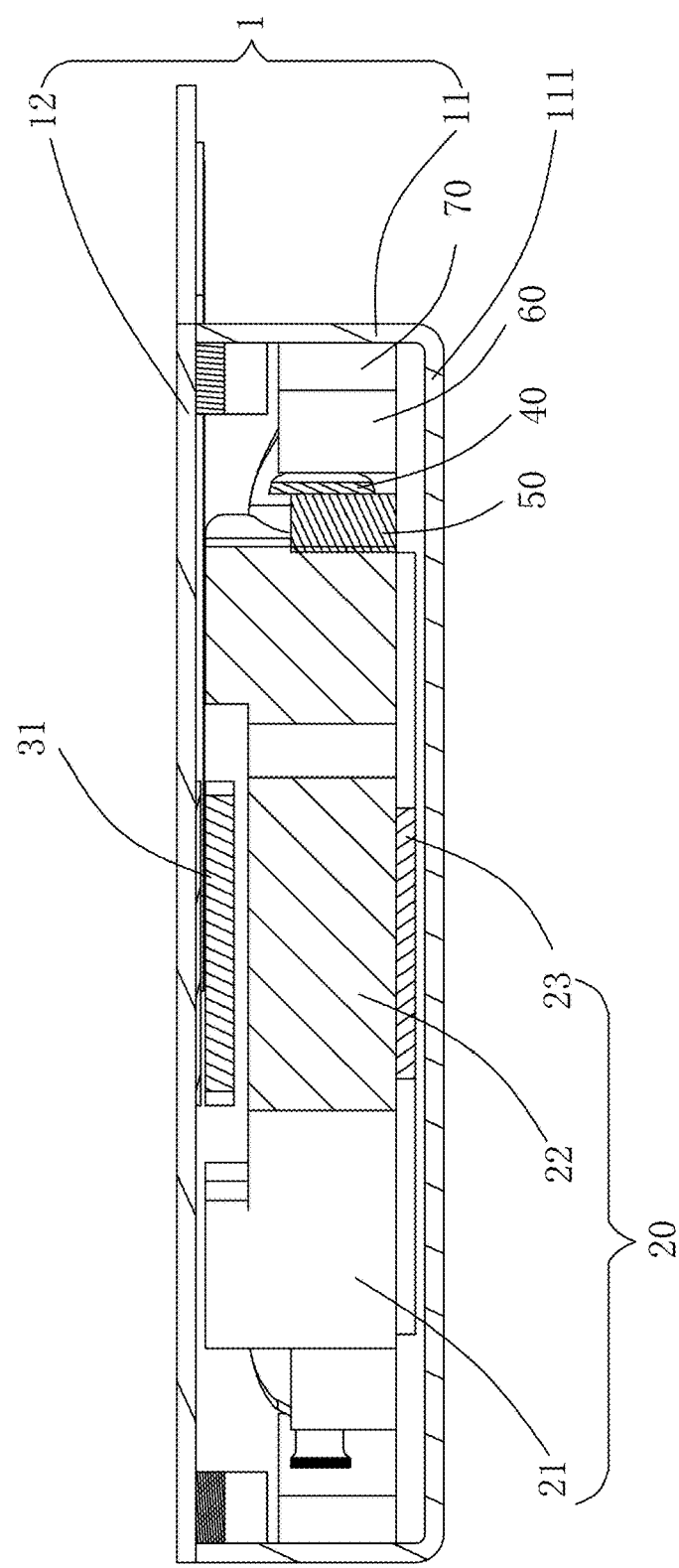
FIG. 3 is a cross-sectional view of the linear vibration motor taken along ling A-A of FIG. 1.
Figure 4:
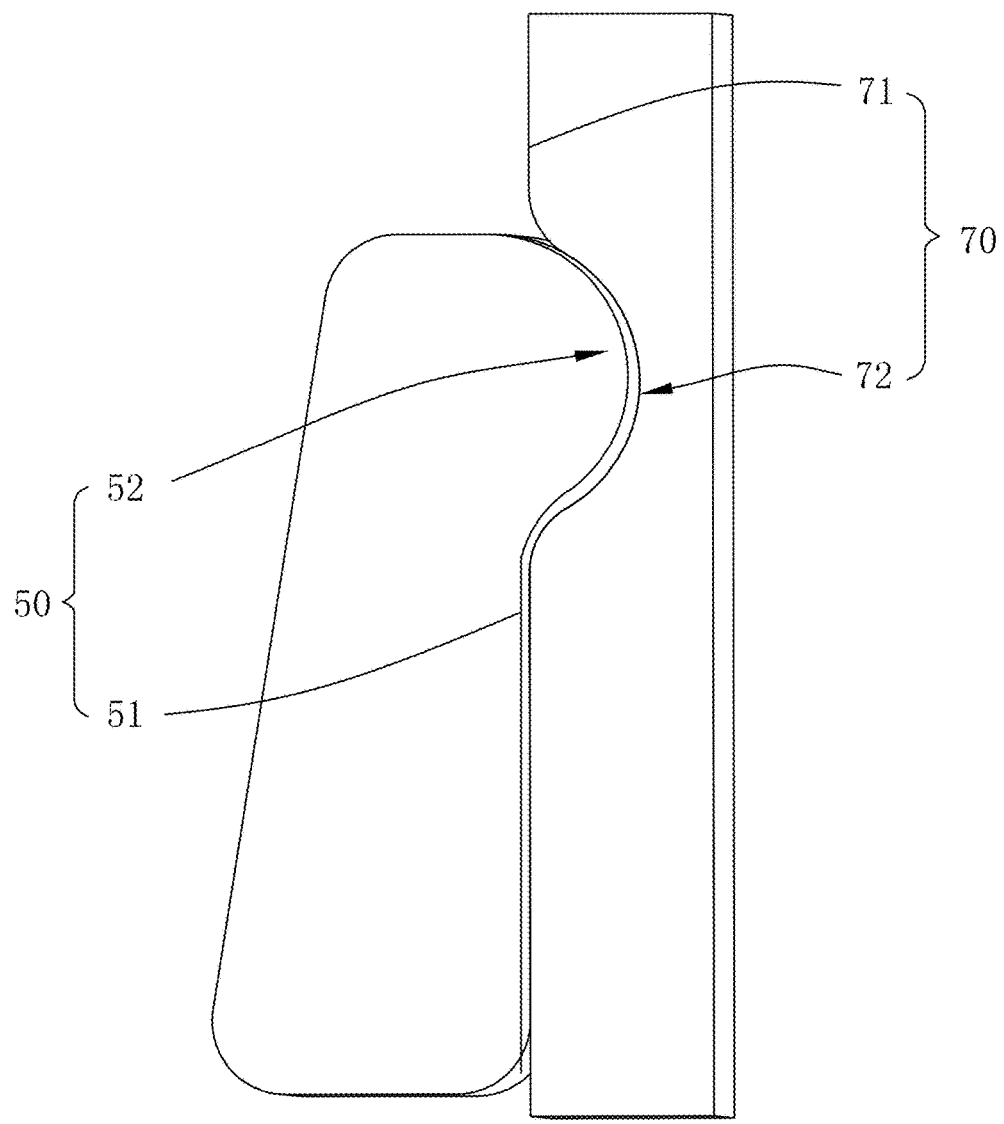
FIG. 4 is an assembled view of a first damping member and a fastening member of the linear vibration motor shown in FIG. 2.

As is shown in FIGS. 1-3, a linear vibration motor 100 comprises a housing 10 having a receiving space, a vibrator unit 20, a stator unit 30, and an elastic member 40 received in the receiving space. Furthermore, the vibrator unit 20 is suspended in the housing 10 by the elastic member 40 in such a way that the vibrator unit 20 is capable of moving to and fro in a longitudinal direction X of the housing 10. The stator unit 30 is fixed in the housing 10 and keeps a distance from the vibrator unit 20.

In the present embodiment, the linear vibration motor 100 further includes a first damping member 50 and a second damping member 60 provided at two opposite sides of the elastic member 40, in order to increase the mechanical damping of the linear vibration motor 100.

The housing 10 includes a base 11 and a cover 12 assembled with the base 11 for forming the receiving space. The housing 10 is substantially in shape of a hollow cuboid. However, it is also possible for the housing 10 to be in other shapes, and the shape of the housing 10 is not limited to what has been described. Specifically, the base 11 includes a bottom wall 111, a pair of first side walls 112 separated from each other, and a pair of second side walls 113 respectively arranged between the pair of the first side walls 112. The first side walls 112 and the second side walls 113 extend from the bottom wall 111 in a direction towards the cover 12. The first side walls 112 extend in a transverse direction of the housing 10, while the second side walls 113 extend in the longitudinal direction of the housing 10. The receiving space is enclosed by the bottom wall 111, the first side walls 112, the second side walls 113 and the cover 12.

Specifically, the vibrator unit 20 includes a weight 21, a magnet assembly 22 received in the weight 21 and a pole plate 23 attached to the weight 21. The magnet assembly 22 includes at least one magnet. Alternatively, the magnet assembly 22 comprises two magnets. Corresponding to the magnet assembly 22, two through-holes are separately formed in the weight 21, and each of the through-holes receives a magnet therein.

The stator unit 30 includes a coil 31, and a circuit board 32 fixed on the cover 12 and facing to the magnet assembly 22. The weight 21 is driven to vibrate linearly in the longitudinal direction X of the housing 10 by the interaction between the coil 31 and the magnet assembly 22 after the coil 31 is electrified by the circuit board 32.

As an alternative configuration, it is also possible for the coil to be received in the weight, and for the magnet assembly to be fixed to the base 11. That is, any component that is relatively fixed with respect to the housing 10 could be defined as the stator unit 30, and any component that is movable with respect to the housing 10 could be defined as the vibrator unit 20.

Two elastic members 40 are provided for elastically suspending the vibrator unit 20, especially the weight 21 in the receiving space. Specifically, one end of each of the elastic members 40 is connected to the weight 21 of the vibrator unit 20, while the other end of each of the elastic members 40 is connected to the corresponding first side wall 112 of the base 11 of the housing 10. Each of the elastic member 40 includes a first elastic arm 41, a second elastic arm 42 separated from the first elastic arm 41, and a deformation arm 43 connecting the first elastic arm 41 to the second elastic arm 42. The first elastic arm 41 is connected to the vibrator unit 20, while the second elastic arm 42 is connected to the housing 10.

The first damping member 50 is arranged between the housing 10 and one side of the elastic member 40, while the second damping member 60 is arranged between the vibrator unit 20 and the other side of the elastic member 40. Optionally, a projection of the first damping member 50 on a plane YZ along the longitudinal direction X of the housing 10 is partially overlapped with a projection of the second damping member 60 on the plane YZ along the longitudinal direction X of the housing 10. In this way, when the vibrator unit 20 moves along the longitudinal direction X and press the first damping member 50, the pressing force may be substantially evenly applied to the first damping member 50 and further evenly transmitted to the second damping member 60. Therefore, the service lives of the first damping member 50 and the second damping member 60 are prolonged. Optionally, the projection of the first damping member 50 projected on the plane YZ perpendicular to the longitudinal direction X of the housing 10 is completely overlapped with the projection of the second damping member 60 projected on the same plane YZ perpendicular to the longitudinal direction X of the housing 10.

Specifically, as is further shown in FIGS. 1-4, the first damping member 50 is sandwiched between the first side wall 112 of the base 11 and the deformation arm 43 of the elastic member 40. In the present embodiment, two first damping members 50 are provided, wherein each of the first damping members 50 is optionally fixed on one side of the deformation arm 43 of the elastic member 40 and is separated from the second damping member 60. The first damping member 50 is optionally made from but not limited to sponge, silicone, foam, fiber, rubber or the like. In particular, the first damping member 50 is made from rubber. Due to the arrangement of the first damping member 50 between the elastic member 40 and the base 11, the mechanical damping of the linear vibration motor 100 is increased, and the response time of the linear vibration motor 100 can be shortened, which means the linear vibration motor 100 has a quicker response.

Figure 5:
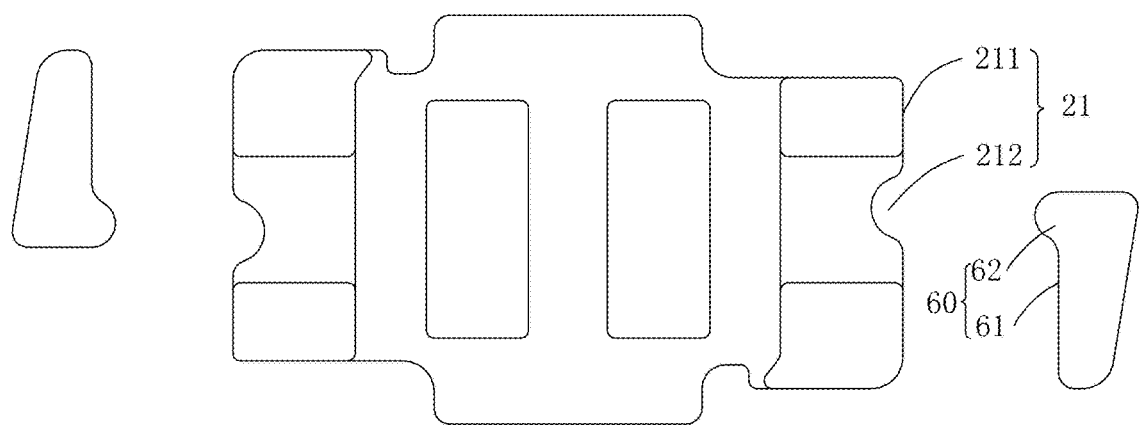
FIG. 5 is a top view showing a second damping member and a weight shown in FIG. 2.

Referring to FIG. 3 and FIG. 5, the linear vibration motor 100 further includes a fastening member 70 cooperatively connected to the first damping member 50. The fastening member 70 is configured for fastening the first damping member, which in turns enhances the stability of the first damping member 50. Two fastening members 70 are respectively fixed on the pair of the first side walls 112 of the base 11 of the housing 10, and are engaged with the corresponding first damping members 50 respectively.

In this case, the first damping member 50 is adapted to the fastening member 70. For example, as is shown in FIG. 3 and FIG. 5, the first damping member 50 includes a first engaging surface 51 which is in contact with the fastening member 70, and a first protruding portion 52 protruding from the first engaging surface 51 in a direction towards the fastening member 70. The fastening member 70 includes a second engaging surface 71 which is engaged with the first engaging surface 51 of the first damping member 50, and a first recess 72 which is adapted to the first protruding portion 52 and which is recessed correspondingly from the second engaging surface 71 in a direction away from the first damping member 50. In this way, the assembly of the first damping member 50 is convenient, and the stability of the linear vibration motor 100 is enhanced.

Optionally, the fastening member 70 is located in the middle of the first side walls 112 which are perpendicular to a vibration direction (which is also the longitudinal direction X in this case), and the first damping member 50 is correspondingly arranged in the middle of the deformation arm 43. In this way, when vibrator unit 20 moves along the longitudinal direction X, the first damping member 50 is evenly pressed by the deformation arm 43, and thus a service life of the first damping member 50 is prolonged.

In a further embodiment, it is also possible to arrange the first protruding portion on the fastening member and to form the recess on the first damping member. However, in other embodiments, it is also possible to fix the fastening member on the elastic member and fix the first damping member on the first side wall of the base.

Referring back to FIGS. 1-4, the second damping member 60 is fixed on the other side of the deformation arm 43 and sandwiched between the deformation arm 43 and the weight 21 of the vibrator unit 20. Specifically, in this case, the second damping member 60 includes a third engaging surface 61 in contact with the weight and a second protruding portion 62 protruding from the third engaging surface 61 in a direction towards the weight 21. Correspondingly, The weight 21 includes a fourth engaging surface 211; a second recess 212 corresponding to the second protruding portion 62 is further recessed from the fourth engaging surface 211 in a direction away from the second damping member 60. During the assembling process, the second protruding portion 62 is snapped into the second recess 212, and thus the second damping member 60 is firmly engaged with the weight 21, and the working performance 15 improved.

Optionally, the first recess 62 is aligned with the second recess 72, so that the first recess 62 is right opposite to the second recess 72.

In addition, the linear vibration motor 100 further includes a plurality of gaskets 80. The gaskets 80 may be attached to the first elastic arm 41 or the second elastic arm 42 for enhancing the connection stability between the elastic member 40 and the housing 10, or between the elastic member 40 and the weight 21, thereby prolonging the service life of the elastic member 40.

In the linear vibration motor of the present disclosure, a first damping member is additionally arranged between the elastic member and the first side walls of the housing. In this way, the mechanical damping of the linear vibration motor is increased, and thus the response time of the linear vibration motor can be shortened, which means the linear vibration motor has a quicker response. Furthermore, a fastening member configured for fastening the first damping member is further provided on the housing, which facilitates the assembly and fastening of the first damping member, and thus the stability of the first damping member is enhanced when the linear vibration motor is working.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the application to the full extent indicated by the broad general meaning of the terms in which the appended claims are expressed.

What is claimed is:
1. A linear vibration motor, comprising:
a housing having a receiving space;
a vibrator unit received in the receiving space;
an elastic member having one end connecting to the vibrator unit and another end connecting to the housing for suspending the vibrator unit in the receiving space;
a first damping member arranged between the housing and the elastic member; and
a second damping member arranged between the vibrator unit and the elastic member,
a fastening member fixed to the housing and engaged with the first damping member, wherein the first damping member includes a first engaging surface in contact with the fastening member, and a first protruding portion protruding from the first engaging surface in a direction towards the fastening member; the fastening member includes a second engaging surface in contact with the first damping member, and a first recess corresponding to the first protruding portion and recessed from the second engaging surface in a direction away from the first damping member.

2. The linear vibration motor as described in claim 1, wherein the first damping member and the second damping member are respectively fixed on two opposite sides of the elastic member.

3. The linear vibration motor as described in claim 1, wherein the elastic member includes a first elastic arm connected to the vibrator unit, a second elastic arm connected to the housing, and a deformation arm connecting the first elastic arm to the second elastic arm; the first damping member is fixed on one side of the deformation arm and sandwiched between the deformation arm and the housing; the second damping member is fixed on the other side of the deformation arm and sandwiched between the deformation arm and the vibrator unit.

4. The linear vibration motor as described in claim 3, wherein the first damping member is arranged in a middle of the deformation arm.

5. The linear vibration motor as described in claim 3 further including a gasket attached to the first elastic arm or the second elastic arm.

6. The linear vibration motor as described in claim 1, wherein the vibrator unit includes a weight and a magnet assembly received in the weight.

7. The linear vibration motor as described in claim 6, wherein the second damping member includes a third engaging surface in contact with the weight, and a second protruding portion protruding from the third engaging surface in a direction towards the weight; the weight includes a fourth engaging surface and a second recess adapted to the second protruding portion and recessed from the fourth engaging surface in a direction away from the second damping member.

8. The linear vibration motor as described in claim 7, wherein the first recess is right opposite to the second recess.

* * * * *